United States Patent [19]

Fossum

[11] Patent Number: 5,276,783
[45] Date of Patent: Jan. 4, 1994

[54] TESSELLATING COMPLEX POLYGONS IN MODELING COORDINATES

[75] Inventor: Gordon C. Fossum, Austin, Tex.

[73] Assignee: International Business Machines Corporation, Armonk, N.Y.

[21] Appl. No.: 439,903

[22] Filed: Nov. 21, 1989

[51] Int. Cl.$^5$ .............................................. G06F 15/62
[52] U.S. Cl. ................................... 395/123; 395/119; 395/133
[58] Field of Search ................ 364/518–122, 717, 722; 340/717, 722; 395/119–123, 128

[56] References Cited

U.S. PATENT DOCUMENTS

| | | | |
|---|---|---|---|
| 3,889,107 | 6/1975 | Sutherland | 235/152 |
| 4,791,582 | 12/1988 | Ueda et al. | 364/522 |
| 4,815,009 | 3/1989 | Blatin | 364/518 |
| 4,855,938 | 8/1989 | Gonzalez-Lopez et al. | 364/522 |
| 4,897,805 | 1/1990 | Wang | 364/521 |

FOREIGN PATENT DOCUMENTS 63-24969  10/1988  Japan .

OTHER PUBLICATIONS

IBM Technical Disclosure Bulletin, "Computer Graphics Using Multi-Echelon Processing Structures," vol. 23, No. 9, Feb. 1981, S. Boinodiris.
Computer Graphics "Scan Line Rendering of Parametric Surfaces," vol. 16, No. 3, Jul. 1982 by D. Schwetzer and E. S. Cobb.
Patent Abstract of Japan vol. 850, No. 831 (P-384) Apr. 26, 1985, & JP-A-60 074 086, K. K. Fujitsu, abstract.
Computer & Graphics, vol. 11, No. 4, 1987, J. R. Rankin, "A Note on Multi-Polygon Area Filling", FIG. 2.

Primary Examiner—Gary V. Harkcom
Assistant Examiner—Almis Jankus
Attorney, Agent, or Firm—Mark E. McBurney

[57] ABSTRACT

A method, in a computer graphics system, manipulates the vertices contained within a group of possibly self intersecting, free space, over lapping polygons, into simple, convex polygons. A normal axis to the complex polygon is determined such that the surface of the polygon is viewed along this normal axis. The polygon surface is then bounded by a rectangle and subdivided into a group of slabs, or smaller rectangles, each rectangular slab being bounded by a pair of interior vertices of the complex polygon. An active edge table is used to store values corresponding to the edges crossing through the slabs, which are used to determine if these edges cross are another at any point within the slab. If a crossing point does exist, the slabs are divided at the crossing point into rectangular sub-slabs until it is determined that no edge intersects another edge within the sub-slabs, of the original slab being considered. At this point, the edges contained within the rectangular slabs can be viewed as simple polygons, or trapezoids which can be filled by a conventional graphics adapter and then displayed.

9 Claims, 6 Drawing Sheets

TESSELLATING COMPLEX POLYGONS IN MODELING COORDINATES

BACKGROUND OF THE INVENTION

One of the objectives of a computer graphics display system user is to have the ability to draw polygons, or groups of polygons, made up of a number of potentially overlapping contours. These contours may be self intersecting and lacking any information regarding their state. There are two major methods of filling a polygon, the winding rule and the odd-even fill rule, the latter being implemented by the present invention. The majority of graphics adapters currently being used are capable of filling simple, convex polygons, but are not able to fill multiple contour, possibly self-intersecting, free space polygons, except on a scan line basis which is an extremely inefficient method of resolving these complex polygons and requires careful consideration of special cases to avoid incorrect rendering of these polygons. It should be noted that hardware solutions to this problem are presently known, but are not able to provide the level of compatibility and efficiency achieved by the present invention.

It would be very desirable to be able to resolve these complex polygons into a group of simple, convex polygons which can then be filled by a conventional graphics adapter.

SUMMARY OF THE INVENTION

In contrast to the prior art, the present invention does resolve self-intersecting, free space, overlapping polygons into convex polygons which conventional graphics adapters have the ability to fill.

The present invention determines from which axis the polygon to be filled is to be viewed. This is accomplished by determining a normal to the polygon and comparing this normal to the closest axis corresponding to one of the standard x,y,z, coordinate axes. Next, a bounding rectangle is computed in three-space having edges parallel to the other two coordinate axes. This rectangle is the smallest one to completely enclose the polygon. This rectangle is then divided into slicing planes, each perpendicular to the long axis of the bounding rectangle, one plane for each vertex of the polygon to be filled. These slicing planes define rectangular regions therebetween which are referred to as slabs.

These slabs will contain edges of the polygon, and an edge table is created to store information regarding these edges. An active edge table is also provided which is used to store current information relating to that subset of the edges stored in the edge table which intersect a given slab. The method of the present invention then proceeds through each slab, updating the active edge table and processing the slab.

This processing determines if any of the edges in the active edge table cross, by sorting the edges according to the averages of their minimum and maximum values within the current slabs. If it is determined that a crossing does exist, then two subordinate rectangular slabs, or sub-slabs are created within the slab being processed. It is then determined if any edge crossings exist within the newly created sub-slabs and if so, these sub-slabs are subdivided once again. This process continues until it is determined that no edges in the active edge table cross within a slab. Once this is determined, then the active edge table can be used to generate a group of simple convex polygons, such as trapezoids which are then turned over to the graphics adapter and filled prior to being displayed. Thus, it can be seen that the present invention resolves complex polygons into convex trapezoids, which conventional graphics adapters are capable of filling and displaying. It should be noted that the present invention enhances the operation of an existing computer graphics system.

In accordance with the previous summary, objects, features and advantages of the present invention will become apparent to one skilled in the art from the subsequent description and the appended claims taken in conjunction with the accompanying drawings.

DETAILED DESCRIPTION OF THE PREFERRED EMBODIMENTS

Figure 1:
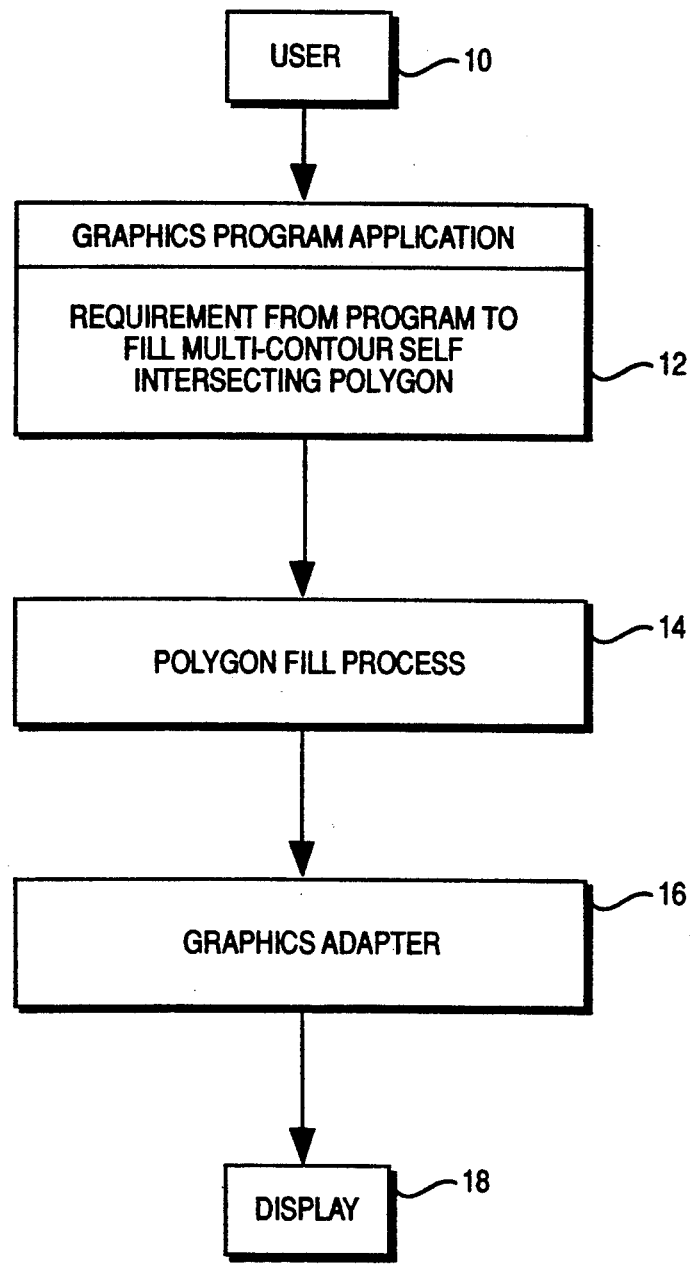
FIG. 1 is a block diagram showing the relationship of the polygon fill process of the present invention with conventional graphics components.

Referring to FIG. 1, a block diagram is shown which represents the components of a graphics display system. A user interface 10 is provided which allows a user of the graphics system to make specific selections regarding the type of graphics application to be implemented.

Reference numeral 12 represents a graphics program application which requires that complex, or self intersecting, overlapping polygons be filled to correctly distinguish their depth (i.e. the portions of a single complex polygon being closer the viewer may be darker than those farther away from the viewer). The present invention, depicted by reference numeral 14 and discussed in greater detail with regard to FIGS. 2A-2C, manipulates this set of complex polygons and resolves them into a group of simple, or convex polygons. These simple polygons are then communicated to a conventional graphics adapter 16, which is capable of filling only simple polygons. The present invention is a processing solution which allows conventional graphics adapters 16 to be enhanced without retrofitting the graphics system with enhanced hardware. Finally, the graphics adapter 16 transmits information corresponding to the filled polygons, to a display 18, such as a CRT or the like, which correctly shows the complex polygons originally required to be filled by the program application 12 and the user.

Figure 2A:
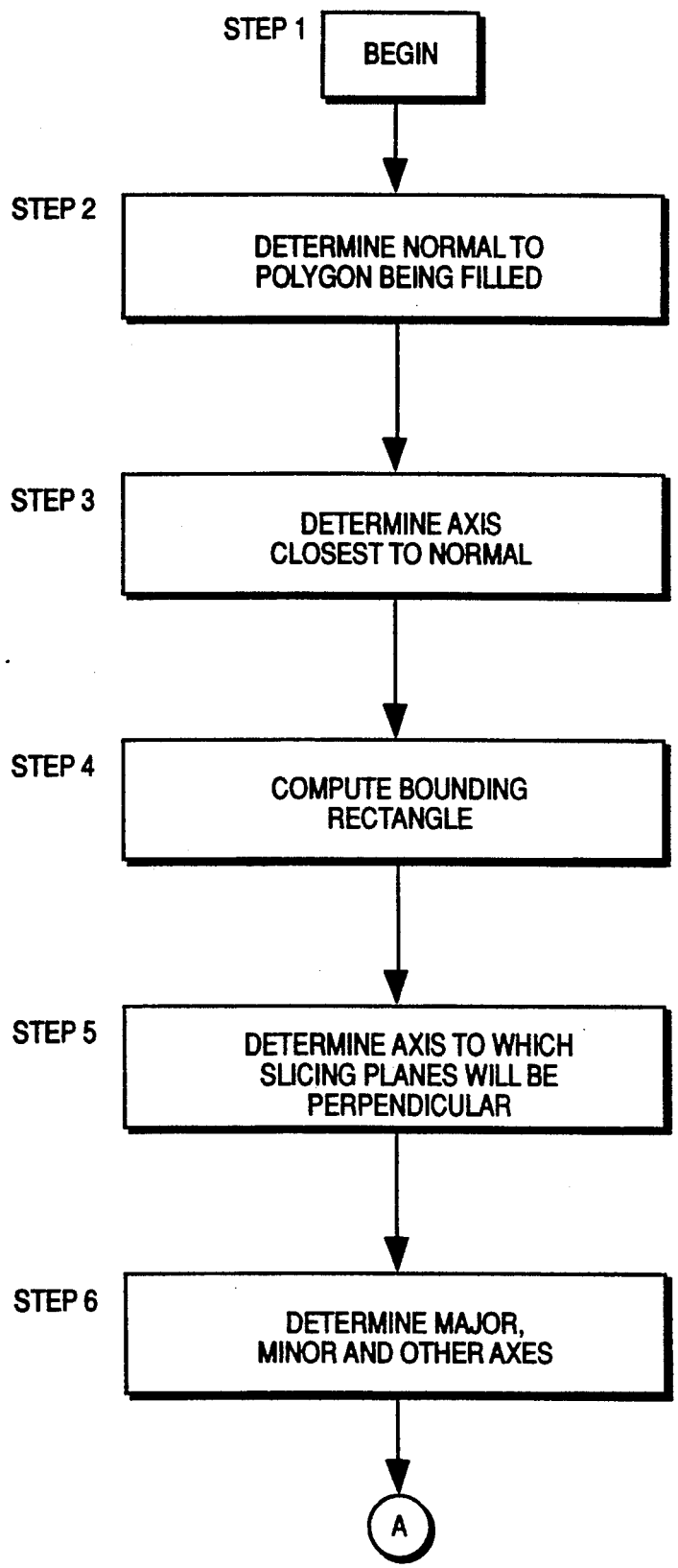
FIGS. 2A-2C are flowcharts representing the steps required by the present invention to implement filling of complex polygons.
Figure 2B:
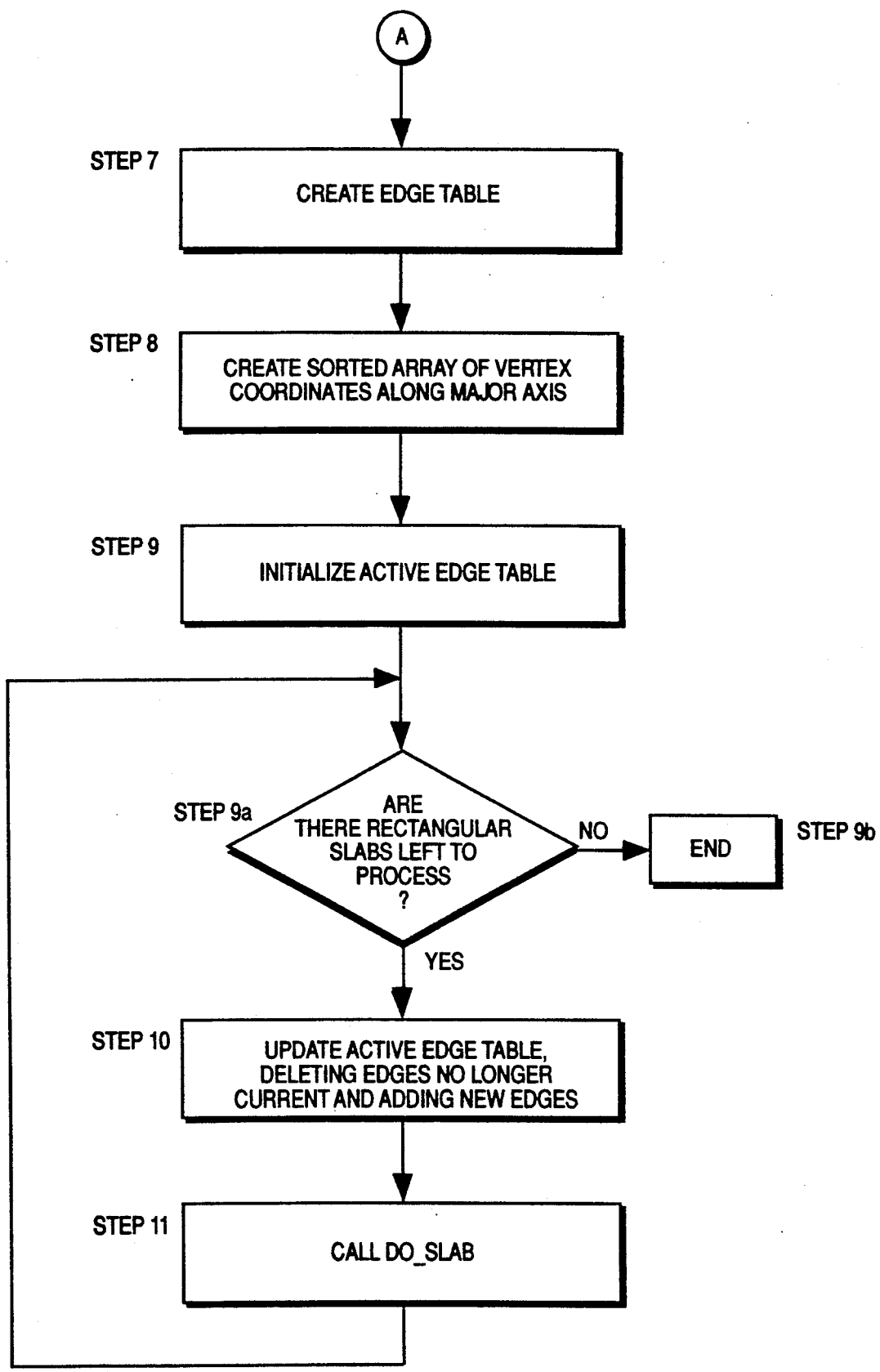
Figure 2C:
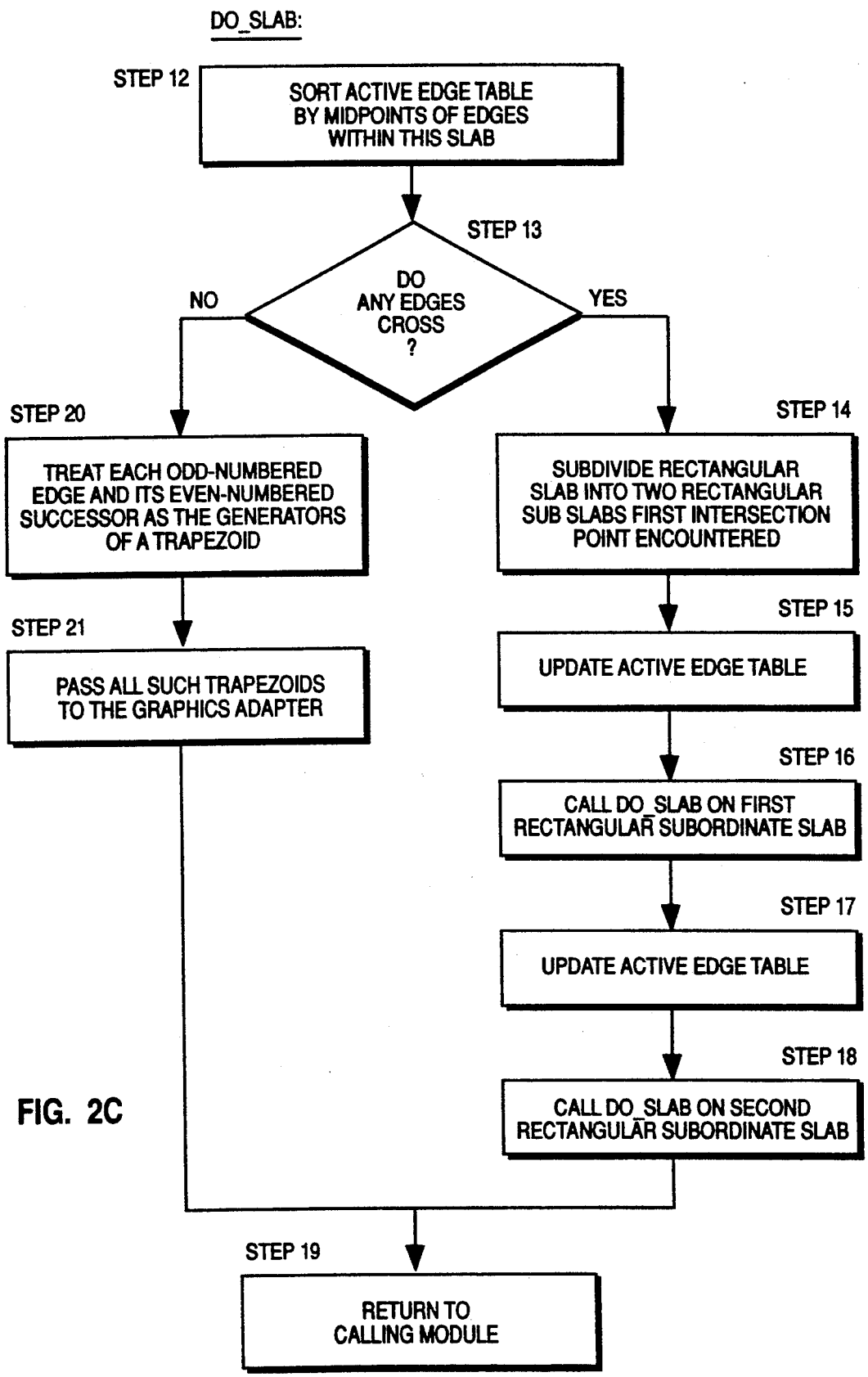

The present invention will now be described with reference to FIGS. 2A-2C, wherein at step 1, the process begins when a user of a program application 12 requests display of a complex polygon. At step 2, the process determines the normal axis to the polygon. This is accomplished by taking the cross product of the first three non-collinear points which are in the definition of the complex polygon, as provided by program application 12. Next, the cartesian coordinate of the normal axis having the largest absolute value will be the direction from which the polygon is to be viewed (step 3). That is, the normal is compared to the x,y,z, axes and the axis closest to the normal is determined to be the direction from which the polygon will be viewed. At step 4, a bounding rectangle is computed which encompasses the complex polygons and intersects at least two of the exterior vertex coordinates of these polygons (see FIG. 5).

The larger axis of the bounding rectangle is then determined, at step 5, the slicing planes being perpendicular to this axis. Step 6 determines the configuration of the x,y,z, axes with respect to the surface of the complex polygon. For, example, if at step 3, it was determined that the normal to the polygon was closest to the z axis, then the z axis would be characterized as the "third" axis. Continuing with this same example, the longest axis (i.e. the axis perpendicular to the slicing planes of step 5) will be characterized as the "major" axis and the remaining axis will be the "minor" axis. Thus, it can be seen that if the z axis is closest to the polygon normal and is the third axis, and the x axis is the longest axis (major axis), then the remaining axis (y) will be the minor axis. The cartesian coordinates will hereinafter be referred to in terms of the corresponding major, minor and third axes.

At step 7, an edge table is created in a storage device, such as a buffer, or the like, which will contain an entry for each edge of the complex polygon. The edge data represented by each entry includes coordinates based upon the major, minor and third axis system, as previously discussed. The edges are thus viewed as being three-dimensional lines, including a major high (MajHi) and a major low (MajLo) which are the larger and smaller of the vertex coordinates along the major axis, respectively. Also included in the edge table for the edge being considered are values representative of the minor high (MinHi) and minor low (MinLo), corresponding to the vertex coordinates of the minor axis. It should be noted that since MajLo and MinLo are derived from the same vertex it is possible for MinHi to be less than MinLo. Further, since MajHi and ThirdHi are derived from the same vertex, it is possible that ThirdHi will be less than ThirdLo. Additionally, the edge table entry includes information regarding the inverse slope of the minor axis (MinIS) and third axis (ThirdIS). MinIS is equal to the span of the minor axis divided by the span of the major axis. Similarly, ThirdIS equals the span of the third axis divided by the span of the major axis. Thus, these values which are necessary to perform subsequent computations, are stored as entries in an edge table at step 7.

At step 8, an array of sorted vertex coordinates, running along the major axis, is created. These coordinates define planes which intersect interior vertices of the complex polygons and are perpendicular to the major axis. Each adjacent pair of these planes further defines a "slab," or rectangular region of space bounded by the two adjacent planes. Next, an active edge table is initialized (step 9) in a storage device, such as a buffer, or the like. The active edge table contains a list of pointers identifying entry information contained in the edge table. The active edge table starts with no entries, but is updated with values relating to the first rectangular slab (created in step 8) being considered by the process of the present invention. Step 9a determines whether there are any slabs remaining to process. If there are no remaining slabs, then the process continues to step 9b and ends. However, if there are slabs remaining to process, then the active edge table will be updated, at step 10 with edge values for the initially considered slab and each subsequent slab to be considered. That is, the MinLo, MinHi, ThirdLo and ThirdHi values correspond to the points of intersection between the edge and the boundary planes of the slab being considered, not necessarily the end points of the edge. The MajHi and MajLo values should correspond to the distance between the vertex coordinates created in step 8. Additionally, as discussed below with regard to step 10, the present invention provides a method of processing red, green, blue (r,g,b) values for the intersection points being calculated.

Step 10 further includes deleting any of the edges previously contained in the active edge table, which do not cross the rectangular area, or slab under consideration, (i.e. those edges having a MajHi that is less than the maximum value along the major axis of the slab being considered). Thus, it can be seen how edges crossing the initial slab being considered may not cross the subsequent rectangular slab under consideration and that the active edge table must be updated to reflect this change. Similarly, it is apparent that successive slabs being considered may include edges which were not contained in the previously considered slab and that the active edge table will need to be updated to include these new edges. That is, those edges whose MajLo is less than the maximum value along the major axis of the slab being considered will be added to the active edge table.

Slab processing then begins at step 11, where the process DoSlab is called. DoSlab is illustrated as a flow chart in FIG. 2C and begins by sorting the active edge table by "midpoint" values of the edges contained therein (step 12). In this context the "midpoint" of an edge within the active edge table is the midpoint of that portion of the edge contained within the current slab. The midpoints can be determined using algebraic equations since the linear equations for the major, minor and third axes are known and the inverse slope of the minor and third axes has been calculated. It is determined at step 13 whether any adjacent edges cross by a linear (not quadratic) process. If it is determined that two edges cross, then it must follow that two neighboring edges in this sorted list must cross. This determination is made by looking at the MinLo and MinHi values for each edge. If one edge has a larger MinLo value and the neighboring edge has a larger MinHi value, then an edge crossing exists and the actual point of the intersection is then computed. If it is determined at step 13 that adjacent edges do cross, then step 14 subdivides the original slab into two rectangular sub-regions, or sub-slabs at the point of intersection of the edges. The process then proceeds to step 15 where the active edge table is updated with values corresponding to that portion of the edges contained in the first rectangular sub-slab being considered. Step 16 calls the DoSlab process for the first subordinate rectangular slab and the present invention continues to step 17 where the active edge table is updated with information regarding edges within the second rectangular sub-slab created at step 14. Next, step 18 calls DoSlab for the second sub-slab, effectively returning the process of the present invention to step 12. Subsequent to the completion of DoSlab processing for the second sub-slab, step 19 returns the process to the calling module which is the loop between steps 9a and 11 of the flowchart of FIG. 2B. However, if at step 13 it is determined, that no edge crossings occur, then at step 20 each odd numbered edge and its even-numbered successor generate a simple polygon or trapezoid which can be turned over to the conventional graphics adapter 16 to be filled (shaded) at step 21. The DoSlab routine then continues to step 19 and on to step 9a of the original process. If at step 9a, there are no slabs remaining to be processed, the process of the present invention proceeds to step 9b and ends. It should also be noted that the present invention is capable of determining the colorization of the edges contained in the edge table. The r,g,b values for each vertex coordinate of the complex polygon being considered will be known. The values of the third (depth) axis are known and are interpolated to update the values in the active edge table. In an analogous fashion by simple interpolation, the r,g,b values along each line in the edge table can be calculated in a manner identical to updating the active edge table. That is, the r,g,b values would be updated for each edge within the active edge at the same time the new edge values being considered are updated. Processing the r,g,b values would require additional computations in step 10 to update both r,g,b and edge values, and additional storage space in the edge table. However, the additional computations are merely linear interpolation and thus contemplated by the present invention.

Figure 3:
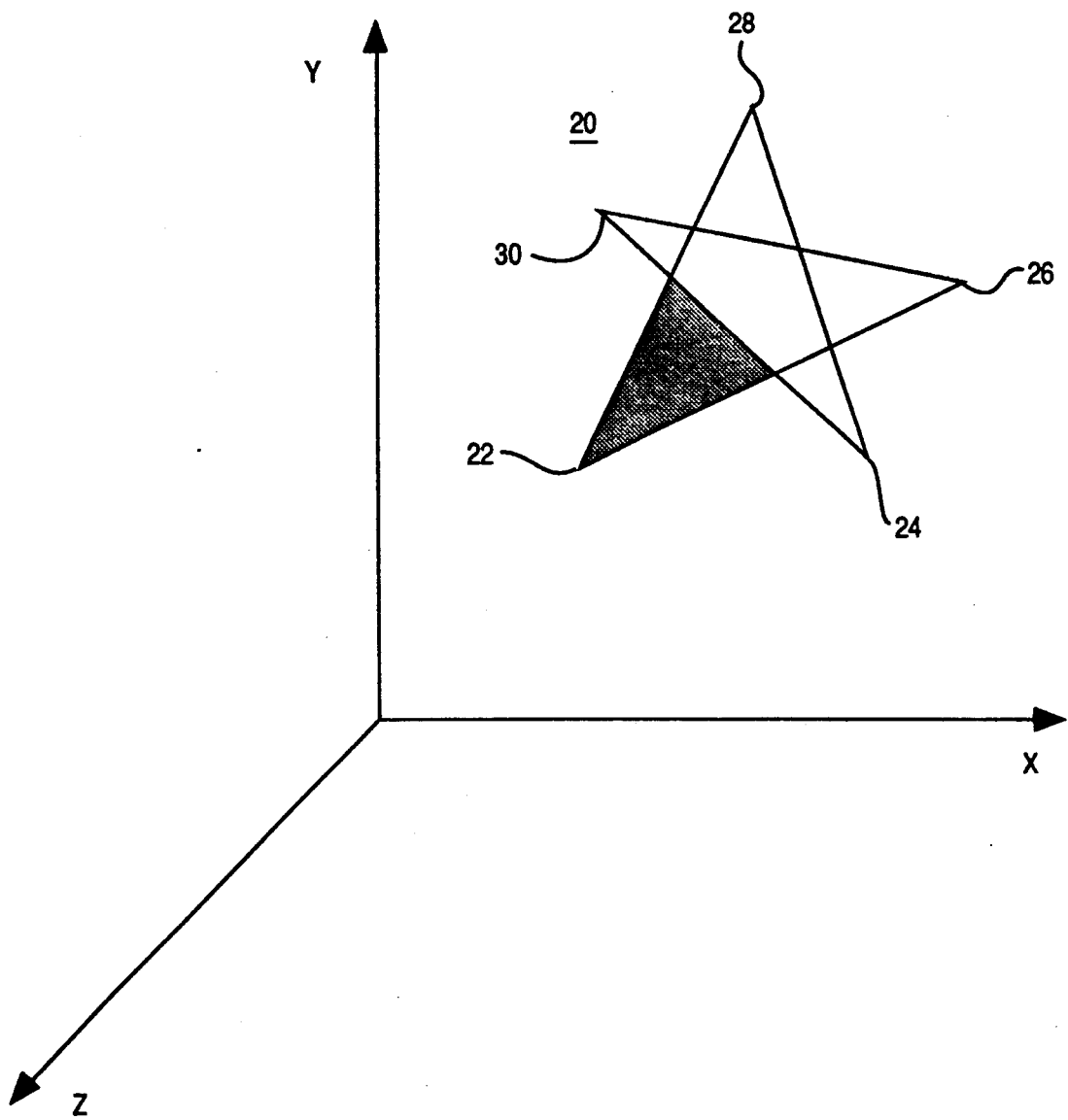
FIG. 3 is a representation of a complex polygon in relation to a cartesian coordinate system.

An example of the process of the present invention will now be discussed with reference to FIGS. 3–5. FIG. 3 shows a complex polygon 20 having vertex coordinates 22,24,26,28,30. Polygon 20 lies substantially in the x-y plane as shown by the cartesian coordinate system. However, for the purposes of this example presume that vertex coordinates 22, 30 lie in the x-y plane, whereas vertices 24, 26, and 28 lie slightly behind the x-y plane.

Since, polygon 20 is substantially in the x-y plane, the z-axis will be closest to its normal (steps 2 and 3). Thus, in this case, the z-axis will be characterized as the third axis and the direction from which polygon 20 will be viewed.

Figure 4:
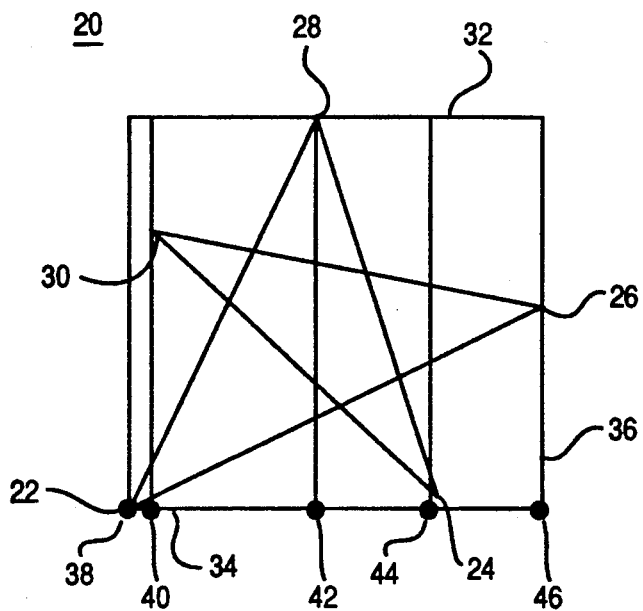
FIG. 4 is the complex polygon of FIG. 3 including a bounding rectangle and divided into rectangular slabs.
Figure 5:
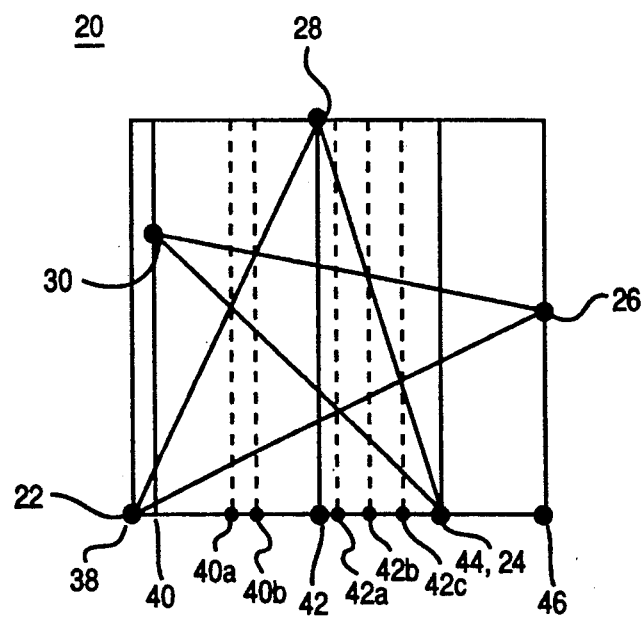
FIG. 5 shows another aspect of the present invention including the complex polygon, bounding rectangle, and slabs which have been divided into sub-slabs.

FIG. 4 shows polygon 20 after being encompassed by a computed bounding rectangle (step 4). Also, an axis 34 has been determined (step 5), which will be perpendicular to the rectangular slabs, and characterized as the major axis, leaving the remaining axis 36 to be the minor axis (step 6). The edge table is then created (step 7) and the vertices 22, 24, 26, 28, 30 of polygon 20 will determine the sorted array of vertex coordinates 38, 40, 42, 44, 46 along the major axis 34 (FIG. 4), which define the rectangular slab boundaries (step 8). The active edge table is then initialized (step 9) and it is determined whether there are any slabs remaining to process (step 9a). At step 10 the active edge table is updated with the edge values (and r,g,b values if desired) for the edges contained in the slab being considered (e.g. the active edge table is updated with the edges in slab 38–40, 40–42, 42–44, and 44–46, in sequence of their consideration). It can be seen that step 10 also adds and deletes edges as required, as subsequent rectangular slabs are considered.

The present invention then calls the process DoSlab (step 11) which sorts the active edge table for edge crossings contained in the slab, being considered. It can be seen from FIG. 5 that no edges cross in slab 38–40 (step 13) and step 20 treats each odd edge and its even successor as a simple polygon, and step 21 then passes these trapezoids to graphics adapter 16 for processing. However, in rectangular slab 40–42 edge 22–28 crosses edge 30–24, thus when the process DoSlab is called for slab 40–42 a subdivision occurs (step 14). The active edge table is then updated with only edges contained within rectangular sub-slab 40–40a and the DoSlab process is called again. It can be seen that no edges cross in sub-slab 40–40a and the present invention continues processing for the remaining portion of slab 40–42. DoSlab is then called for the second portion of slab 40–42 (i.e. sub-slab 40a–42) where it is determined that a crossing does exist and rectangular sub-slabs 40a–40b and 40b–42 are created. Again, DoSlab is called for these slabs which determines that there are no crossings in sub-slabs 40a–40b and 40b–42. Consequently, the entire rectangular slab 40–42 has now been processed into simple polygons which have been handed off to the adapter. The present invention uses identical methods to those just discussed, with respect to slab 40–42, to resolve slabs 42–44 and 44–46 into simple polygons which can then be processed by a conventional graphics adapter 16.

Although certain preferred embodiments have been shown and described, it should be understood that many changes and modifications may be made therein without departing from the scope of the appended claims.

What is claimed is:

1. A method of displaying, at least one complex polygon, having at least one edge that intersects itself, requested to be displayed by a program application running on a computer graphics system, said method comprising the steps of:

determining an angle from which said complex polygon is to be viewed;

encompassing said complex polygon by a bounding rectangle that intersects at least two exterior vertex coordinates of said complex polygon;

dividing said bounding rectangle into rectangular regions, such that none of said regions contain any interior vertices where at least one of said complex polygon edges intersects itself;

filling portions of said complex polygon within said rectangular regions by a graphics adapter; and displaying all of said complex polygon, based upon said filled portions.

2. A method according to claim 1 wherein said step of determining comprises the steps of:

computing an axis perpendicular to a surface of said complex polygon;

comparing said perpendicular axis to the x,y,z axes contained within a cartesian coordinate system to determine the closest one of said x,y,z axes to said perpendicular axis; and characterizing said perpendicular axis by one of the x,y,z, axes closest thereto.

3. A method according to claim 1, wherein said step of dividing comprises the steps of:

determining a longest axis of said bounding rectangle having a length longer that any other axis of said bounding rectangle;

determining a shortest axis of said bounding rectangle having a length shorter than any other axis of said bounding rectangle; and determining dimensions of said rectangular regions, each region having a length equal to said shortest axis, and a width determined by two planes perpendicular to said longest axis and intersecting a vertex coordinate of said complex polygon.

4. A method according to claim 3 wherein said step of dividing comprises the step of:

subdividing said rectangular regions into rectangular sub-regions, said regions being subdivided by at least one additional plane that is perpendicular to said longest axis and contains at least one of said interior vertices where at least one of said complex polygon edges intersects itself.

5. A method according to claim 1 further comprising the step of:

providing first means for storing values representative of all of the edges of said complex polygon.

6. A method according to claim 5 further comprising the step of:

providing second means for storing values representative of the edges of said complex polygon contained within said regions.

7. A method according to claim 4 wherein said step of subdividing comprises:

determining a point of intersection of any of said edges contained within said complex polygon that intersects itself.

8. A method according to claim 4 wherein said step of subdividing is repeated until there are no said points of intersection contained within said regions of said sub-regions.

9. A method according to claim 8 wherein said step of providing means for storing values representative of the edges of said complex polygon contained within said regions, comprises the step of:

providing means for storing information representative of a color value of said edges contained within said first means for storing values.

* * * * *